United States Patent [19]

Fujibayashi

[11] 3,998,117
[45] Dec. 21, 1976

[54] CUTTING APPARATUS FOR A ROD OR WIRE MATERIAL

[76] Inventor: Kimiya Fujibayashi, 28-7, Sumiregaoka, Kohoku, Yokohama, Kanagawa, Japan

[22] Filed: Aug. 26, 1975

[21] Appl. No.: 607,807

[30] Foreign Application Priority Data

Sept. 4, 1974 Japan .................. 49-101579

[52] U.S. Cl. ........................... 83/199; 83/580
[51] Int. Cl.² ............................................ B26D 3/16
[58] Field of Search ............. 83/196, 199, 580

[56] References Cited

UNITED STATES PATENTS

| 676,156 | 6/1901 | Schärfl | 83/199 |
|---|---|---|---|
| 690,083 | 12/1901 | Stolpe | 83/199 |
| 2,428,650 | 10/1947 | Brunner | 83/199 |
| 2,841,220 | 7/1958 | Lardenois | 83/199 |
| 3,494,233 | 2/1970 | Kojima | 83/199 |

Primary Examiner—Frank T. Yost
Attorney, Agent, or Firm—Oblon, Fisher, Spivak, McClelland & Maier

[57] ABSTRACT

A cutting apparatus for a rod or wire material comprises a pair of cutting blades assembled in a sliding pair which includes cutting edge holes for inserting and cutting the rod or wire material at the center thereof. The cutting blades are connected to a link mechanism for imparting to the cutting blades a gradually magnified helical motion.

5 Claims, 12 Drawing Figures

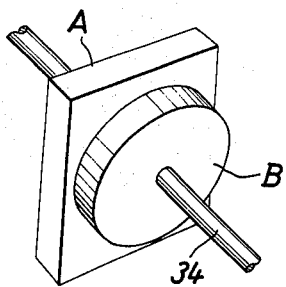
FIG.1
FIG.2
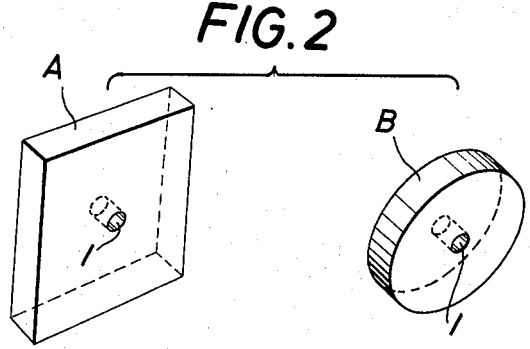
FIG.3
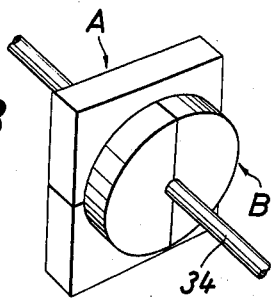
FIG.4
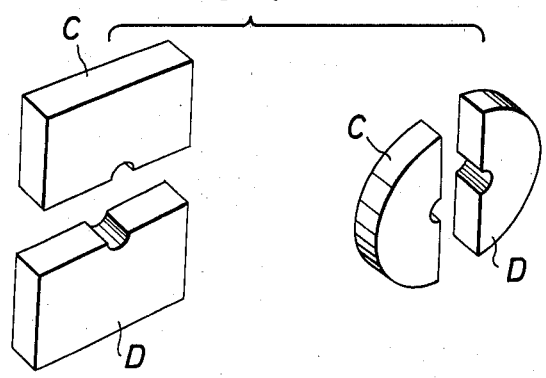

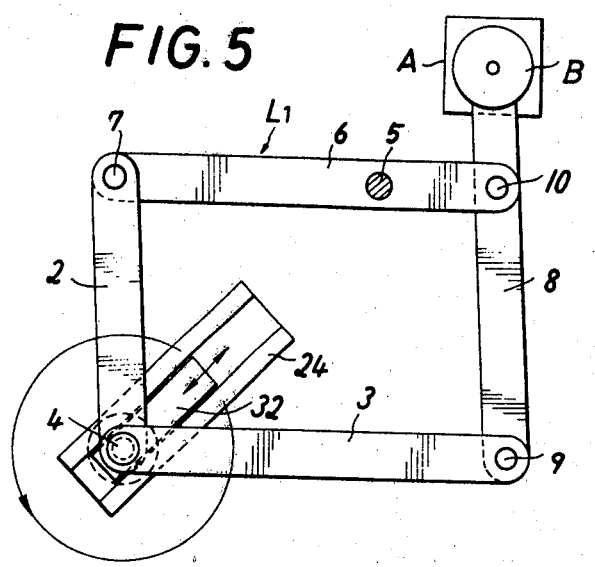
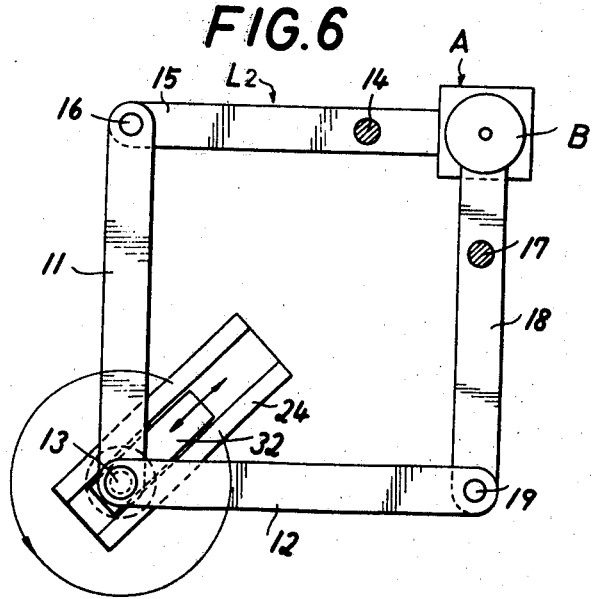

CUTTING APPARATUS FOR A ROD OR WIRE MATERIAL

BACKGROUND OF THE INVENTION

1. Field Of The Invention

The present invention relates generally to a cutting apparatus and more particularly to a cutting apparatus for wires, bars or rods.

2. Description Of The Prior Arts

It is common practice to use cutters as a means for cutting off metal bars, rods or wire materials at a desired length. The cutters generally include upper and lower cutting edges which are linear in shape and arranged so as to be in a sliding contact with each other. The cutting operation is conducted by putting a workpiece between the cutting edges and depressing the workpiece with the cutting edges manually or by motive power.

In this instance, there remains burrs, sags and the like on the cut surface of the workpiece and a smoothly cut surface can not be obtainable, because the workpiece is cut by pressing from one side.

Therefore, in the conventional cutting operation of the rods or wire materials, a secondary process is required for smoothly finishing the cut surface of the workpiece. In this process, it is essential to minimize the amount of metal removed from the cut surface of the workpiece from engineering and economic standpoints, particularly when the workpiece is expensive.

SUMMARY OF THE INVENTION

Accordingly, it is an object of the present invention to provide a cutting apparatus for rods or wire materials which overcomes the aforementioned conventional problems.

Another object of the present invention is to provide a cutting apparatus for enabling bars or rods to be cut sharply without remaining burrs or sags on the cut surface of the workpiece.

Still another object of the present invention is to provide a cutting apparatus for bars or wire materials which eliminates the necessity for a secondary process of the workpiece for finishing the cut surface.

Yet another object of the present invention is to provide a cutting apparatus for enabling bars or wire materials to be cut continuously with high efficiency.

Briefly, the foregoing and other objects are attained in accordance with the present invention by the provision a cutting apparatus including a pair of cutting blades having planar surfaces which are firmly assembled by contacting their surfaces so as to be able to slide. Each of the cutting blades may be made of a hard metal plate having a suitable shape such as square, circular or elliptical and includes cutting edge holes in which a workpiece is inserted for cutting. The cutting blade are actuated by a link mechanism which causes either or both of the cutting blades to make a gradually magnified circular motion, thereby cutting the workpiece by the action of the cutting edge holes.

BRIEF DESCRIPTION OF THE DRAWINGS

Various other objects, features and attendant advantages of the present invention will be more fully appreciated as the same becomes better understood by reference to the following detailed description when considered in connection with the accompanying drawings, wherein:

FIG. 1 is a perspective view of a pair of cutting blades according to the present invention assembled by contacting their surfaces and inserted a rod to be cut in cutting edge holes;

FIG. 2 is an exploded perspective view of the respective cutting blades shown in FIG. 1;

FIG. 3 is a perspective view of a pair of cutting blades according to another embodiment of the present invention assembled by contacting their surfaces and inserted a rod to be cut in the cutting edge holes;

FIG. 4 is an exploded perspective view of the respective cutting blades shown in FIG. 3;

FIG. 5 is a schematic view of a link mechanism for giving a circular motion to one of the cutting blades for cutting a rod while another cutting blade is fixed;

FIG. 6 is a schematic view of a link mechanism for driving both of the cutting blades for cutting a rod;

DESCRIPTION OF THE PREFERRED EMBODIMENTS

Figure 7:
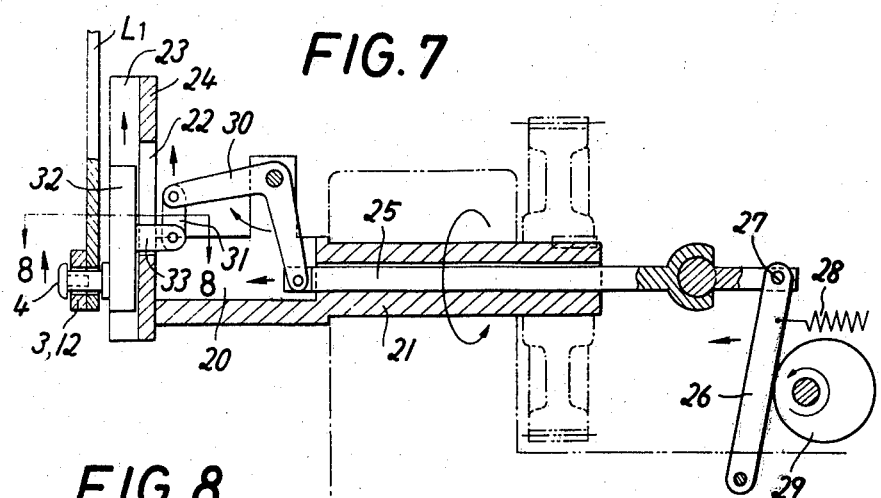
FIG. 7 is a schematic view of a driving device for operating the link mechanisms shown in FIGS. 5 and 6.

Referring now to the drawings, and more particularly to FIGS. 1 and 2, the cutting apparatus includes cutting blades A and B which may be any shape, such as square, circular or elliptical. In FIGS. 1 and 2, the cutting blade A is shown as square, while the cutting blade B is shown as circular. These cutting blades A and B are provided with holes 1 for passing a rod, bar or wire material through at the center thereof. The circumferences of these holes serve as cutting edges.

As shown in FIGS. 3 and 4, the cutting blades A and B may be divided into two halves C and D so that they can be tightly assembled into a cutting blade in a suitable manner.

The cutting blades A and B are assembled as a relatively sliding pair of blades by contacting each surface of the cutting blades A and B tightly so as to render the same slidable on their surfaces. According to the present invention, the cutting blades A and B are driven so as to make a gradually magnifying circular motion by using a link mechanism. This circular motion may be given to both cutting blades A and B or either one of the cutting blades, while the other cutting blade is fixed.

Various link mechanisms can be considered for imparting the circular motion to the cutting blades A and B, as for example, a link mechanism for driving the cutting blade B while the cutting blade A is fixed as shown in FIG. 5, or a link mechanism for driving both cutting blades A and B as shown in FIG. 6.

Referring to the link mechanism for driving only the cutting blade B shown in FIG. 5, the link mechanism generally indicated by the reference numeral L1 includes links 2 and 3 rotatably connected at one end thereof by a pin 4. At the other respective end of the links 2 and 3, levers 6 and 8 are rotatably connected by pins 7 and 9, which are in turn connected together by a connecting pin 10 serving as a fulcrum of the lever 8. The lever 6 is rotatably supported by a fixed pin 5 serving as a fulcrum of the lever 6 and the lever 8 is connected to the cutting blade B.

Referring to the link mechanism for driving both cutting blades A and B shown in FIG. 6, the link mechanism generally indicated by the reference numeral $L_2$ includes links 11 and 12 rotatably connected at one end thereof by a pin 13. At the other respective end of the links 11 and 12, levers 15 and 18 are rotatably connected by pins 16 and 19. These levers 15 and 18 are rotatably supported by fixed pins 14 and 17 respectively which serve as fulcrums for the levers 15 and 18, and the cutting blade A is connected to the end of lever 15, while the cutting blade B is connected to the end of lever 18. These link mechanisms $L_1$ and $L_2$ are operated by a quick-return motion device which will be hereinafter described in detail in conjunction with FIG. 7.

Figure 8:
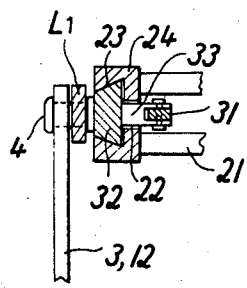
FIG. 8 is a partial sectional view taken along the line 8 — 8 of FIG. 7.

As shown in FIG. 7, the quick return motion device comprises a hollow rotary shaft 21 provided with a swivel lever 24 at the end thereof. The swivel lever 24 includes an elongated guide hole 22 and a dovetail groove 23 in which a slider 32 having a leg 33 is inlaid in such a manner that the leg 33 is projected through the guide hole 22 as shown in FIG. 8. Within the hollow rotary shaft 21, a sliding rod 25 is extended. The sliding rod 25 includes a universal joint at one end thereof which is connected to a lever 26 by a pin 27. The lever 27 is biased by a spring 28 so that it can be always in contact with a cam 29. At the other end of the sliding rod 25, there is provided a bell crank 30, which is connected to the sliding rod 25 and the leg 33 of the slider 32 by means of a link 31. The pin 4 connecting the links 2 and 3 is secured to the slider 32.

Now, the operation of the apparatus according to the present invention will be hereinafter described in detail.

First, the sliding rod 25 passing through the hollow rotary shaft 21 is retracted to slide the slider 32 by means of the bell crank 30, to thereby make the center line of the slider 32 coincide with that of the hollow rotary shaft 21. In this condition, the holes 1 of the cutting blades A and B are registered, which allows the rod or material 34 to pass through the holes 1. Then, the hollow rotary shaft 21 is rotated by a suitable rotating device (not shown), and at the same time the sliding rod 25 is gradually advanced by the rotation of the cam 29. By this operation, the swivel lever 24 is rotated together with the hollow rotary shaft 21, and the slider 32, to which the pin 4 of the link mechanism $L_1$ is secured, is gradually moved along the dovetail groove 23 of the swivel lever 24 by the action of the bell crank 32 advanced by the sliding rod 25. In other words, the center of the motion of link mechanism is shifted due to the advance of the sliding rod 25 synchronously with the rotation of the swivel lever 24 for actuating the link mechanism.

Since the link mechanisms $L_1$ and $L_2$ are constructed as explained the above, the pin 4 or 13 is advanced in an offset position relative to the axis of the hollow rotary shaft 21 when the sliding rod 25 is pushed forward and makes a circular motion, thereby moving the links 2 or 11 upwardly and downwardly and the link 3 or 12 laterally. It is noted that the lateral motion of the link 3 or 12 has a phase lag of 90 degrees relative to the up-and-down motion of the link 2 or 11. In other words, the sine curve of the lateral motion of the link 3 or 12 has a phase lag of 90 degrees relative to that of the up-and-down motion of the link 2 or 11.

When the links 2 and 3 or 11 and 12 are moved in the manner as stated the above, the levers 6 and 8 or 15 and 18 connected to the links 2 and 3 or 11 and 12 are respectively actuated, thereby giving an up-and-down and a lateral motion to both of the cutting blades or one of the cutting blades. These motions are gradually magnified by the movement of the slider 32 caused by the advance of the sliding rod 25. Therefore, the cutting blades make the gradually magnified swivelling motion tracing substantially helical and arcuate lines, respectively.

The helical motion of the cutting blades is induced from the point of the pin 4, and the cutting of the rod or wire material by the edges gradually proceeds from the periphery of the material towards the central portion thereof as shown in FIGS. 9(a), 9(b), 9(c) and 9(d). The cutting is completed when the depth of cut exceeds the central portion of the material.

Figures 9A, 9B, 9C, 9D:
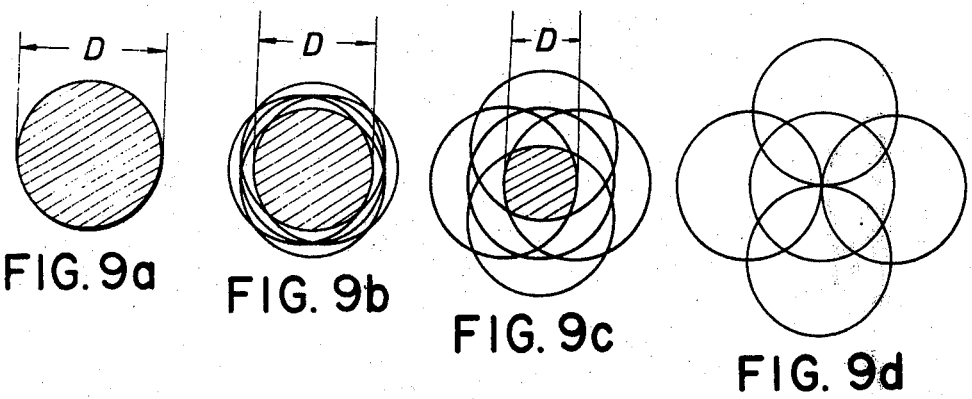
FIGS. 9a–9d are schematic diagrams showing a process for cutting a rod according to the present invention.

FIGS. 9(a) to 9(b) are schematic diagrams respectively showing the motion of the cutting blade and the cutting condition of the material at the points during the movement of slider 32, in which the cutting blade A is fixed and the cutting blade B is actuated. FIG. 9(a) shows the condition where the slider 32 is in the original position; FIG. 9(b) shows the condition where the slider 32 has been slightly moved; FIG. 9(c) shows the condition where the slider 32 has been advanced up to about the middle point of its stroke; and FIG. 9(d) shows the condition where the slider 32 has been advanced up to the final point of its stroke and the cutting has been completed. (Hatched portions are non-cut portions of the material).

When the cutting is completed in the manner as explained the above, the crest of the cam 29 is released from the lever, and then the return spring 28 pulls the lever 26 backwards. As a result, the sliding rod 25 is moved backwards, thereby the bell crank 30 is operated in the direction reverse to that of the cutting operation. Thus, the slider 32 of the swivel lever 24 returns to its original position and the holes 1 of the cutting blades A and B are aligned with each other ready for the next cutting operation.

Obviously, many modifications and variations of the present invention are possible in light of the above teachings. It is therefore to be understood that within the scope of the appended claims, the invention may be practiced otherwise than as specifically described.

I claim:

1. A cutting apparatus for a rod or wire material comprising:
    a pair of cutting blades having planar surfaces and assembled in a sliding pair by contacting said surfaces so as to be able to slide on said surfaces and having cutting edge holes for receiving and cutting a workpiece;
    a link mechanism connected at one end thereof to at least one of said cutting blades for imparting a gradually magnified arcuate motion to said at least one of said cutting blades; and
    a means connected to the other end of said link mechanism for driving said link mechanism by simultaneously gradually shifting said other end of said link mechanism lineally while said drive means is rotating.

2. A cutting apparatus according to claim 1 wherein said link mechanism is a four-bar linkage mechanism to which one of said cutting blades is connected, thereby imparting a gradually magnified helical motion to said cutting blade while the other one of said cutting blades is fixed.

3. A cutting apparatus according to claim 1 wherein said link mechanism is a four-bar linkage mechanism to which both of said cutting blades are connected, thereby imparting a gradually magnified oscillating motion to said cutting blades.

4. A cutting apparatus according to claim 1 wherein said means for driving said link mechanism comprises a swivel lever having a slider to which said other end of said link mechanism is connected, said swivel lever being connected to a rotary driving shaft and said slider being connected to a linear motion mechanism.

5. A cutting apparatus according to claim 4 wherein said linear motion mechanism comprises a bell crank connected to a rod reciprocally sliding within said rotary driving shaft at an end thereof and said rod is connected at the other end thereof to a lever operatively contacting a cam.

* * * * *